United States Patent
Thorn et al.

(10) Patent No.: US 10,194,067 B2
(45) Date of Patent: Jan. 29, 2019

(54) LIFELOG CAMERA AND METHOD OF CONTROLLING IN ASSOCIATION WITH AN INTRAPERSONAL AREA NETWORK

(71) Applicants: Ola Thorn, Limhamn (SE); Henrik Bengtsson, Lund (SE); Sony Corporation, Tokyo (JP)

(72) Inventors: Ola Thorn, Limhamn (SE); Henrik Bengtsson, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 96 days.

(21) Appl. No.: 14/388,593

(22) PCT Filed: Jun. 3, 2014

(86) PCT No.: PCT/IB2014/061929
§ 371 (c)(1),
(2) Date: Sep. 26, 2014

(87) PCT Pub. No.: WO2015/185962
PCT Pub. Date: Dec. 10, 2015

(65) Prior Publication Data
US 2016/0241769 A1  Aug. 18, 2016

(51) Int. Cl.
*H04N 5/232* (2006.01)
*H04N 5/225* (2006.01)

(52) U.S. Cl.
CPC ....... *H04N 5/23206* (2013.01); *H04N 5/2257* (2013.01)

(58) Field of Classification Search
CPC ............... G06K 7/10009; G06K 19/00; G06K 9/00771; H04N 7/18; H04N 5/23216; H04N 1/32776; H04N 1/00315; G06F 1/1698; G08B 13/196
USPC ............ 348/143, 211.1, 211.2, 211.3, 211.4, 348/211.6
See application file for complete search history.

(56) References Cited

U.S. PATENT DOCUMENTS

| 6,580,356 B1 | 6/2003 | Alt et al. |
| 7,202,773 B1 | 4/2007 | Oba et al. |
| 2004/0248569 A1* | 12/2004 | Kondou ............. G06K 19/0723 455/426.1 |

(Continued)

FOREIGN PATENT DOCUMENTS

| EP | 2 018 038 A2 | 1/2009 |
| EP | 2018038 | 1/2009 |

(Continued)

OTHER PUBLICATIONS

International Search Report and Written Opinion from corresponding International Application No. PCT/IB2014/061929, dated Sep. 3, 2014.

(Continued)

*Primary Examiner* — Xi Wang
(74) *Attorney, Agent, or Firm* — Renner, Otto, Boisselle & Sklar, LLP

(57) ABSTRACT

Controlling a lifelog camera (10) via a first intrapersonal area network (IAN) (12) associated with a first user (14) includes detecting a second IAN (18) associated with a second user (20) in range of the first IAN (12) and capturing an image of the second user (20) with the lifelog camera (10).

16 Claims, 3 Drawing Sheets

(56) References Cited

U.S. PATENT DOCUMENTS

| | | |
|---|---|---|
| 2005/0008148 A1 | 1/2005 | Jacobson |
| 2005/0243061 A1 | 11/2005 | Liberty et al. |
| 2006/0070108 A1* | 3/2006 | Renkis ............... G08B 13/196 725/105 |
| 2007/0145119 A1 | 6/2007 | Rhelimi |
| 2007/0282783 A1 | 12/2007 | Singh |
| 2009/0021591 A1* | 1/2009 | Sako ................. H04N 1/00339 348/211.2 |
| 2009/0051785 A1* | 2/2009 | Kamada ................ H04N 7/183 348/231.5 |
| 2009/0094681 A1 | 4/2009 | Sadler et al. |
| 2010/0029326 A1* | 2/2010 | Bergstrom ............. G11B 27/11 455/556.1 |
| 2010/0277342 A1* | 11/2010 | Sicurello ................ H04Q 9/00 340/870.3 |
| 2010/0277435 A1 | 11/2010 | Han et al. |
| 2011/0205156 A1 | 8/2011 | Gomez et al. |
| 2012/0026129 A1 | 2/2012 | Kawakami |
| 2012/0249409 A1 | 10/2012 | Toney et al. |
| 2012/0324368 A1 | 12/2012 | Putz et al. |
| 2013/0017789 A1 | 1/2013 | Chi et al. |
| 2013/0057713 A1* | 3/2013 | Khawand ............. H04N 5/232 348/208.1 |
| 2013/0086023 A1* | 4/2013 | Tsukamoto ........... G06Q 10/10 707/705 |
| 2013/0174049 A1 | 7/2013 | Townsend et al. |
| 2014/0059704 A1 | 2/2014 | Kamada et al. |
| 2014/0085050 A1 | 3/2014 | Luna |
| 2014/0111668 A1 | 4/2014 | Kon et al. |
| 2014/0365979 A1* | 12/2014 | Yoon ....................... G06F 3/017 715/863 |
| 2015/0316676 A1* | 11/2015 | Song ....................... G06F 3/011 702/19 |

FOREIGN PATENT DOCUMENTS

| | | |
|---|---|---|
| EP | 2378748 | 10/2011 |
| EP | 2600319 | 6/2013 |
| JP | 2007-150993 A | 6/2007 |
| JP | 2008 073462 | 4/2008 |
| JP | 2009 049951 | 3/2009 |
| JP | 2009-049951 A | 3/2009 |
| JP | 2009-55080 | 3/2009 |
| JP | 2009-111571 A | 5/2009 |
| JP | 2011-188209 | 9/2011 |
| JP | 2012-019351 | 1/2012 |
| JP | 2014-86849 | 5/2014 |
| WO | 2011/021531 | 2/2011 |

OTHER PUBLICATIONS

Bionym, "The Nymi White Paper", Nov. 19, 2013.
International Search Report and Written Opinion dated Sep. 3, 2014 for corresponding International Application No. PCT/IB2014/061929.

* cited by examiner

LIFELOG CAMERA AND METHOD OF CONTROLLING IN ASSOCIATION WITH AN INTRAPERSONAL AREA NETWORK

TECHNICAL FIELD OF THE INVENTION

The technology of the present disclosure relates generally to lifelog cameras and, more particularly, to a lifelog camera controlled in association with an intrapersonal area network.

BACKGROUND

A lifelog camera is a camera device that is typically worn by a user and used to capture photos that serve a photographic memory of events occurring near the user. Conventional lifelog cameras are configured to capture images on a timed basis. In some devices, for example, an image is captured every 30 seconds. When lifelog cameras are configured to capture images on a timed basis, they may capture a significant number of images per day (nearly 3000 images if the camera captures an image every 30 seconds). Under this approach, many of the images captured by conventional lifelog cameras are not very interesting, and the lifelog camera may miss important events. Therefore, a lifelog camera's memory may become filled with photos that are not of interest to the user. More compelling moments may occur rather quickly and between the timed increments for taking a photo. However, it is difficult to determine those compelling moments.

SUMMARY

The disclosed techniques for controlling operation of a lifelog camera employ a first intrapersonal area network (IAN) associated with a first user as a trigger for taking photos using the lifelog camera by detecting a second IAN associated with a second user in range of the first IAN and capturing an image of the second user with the lifelog camera. It is contemplated that capturing an image on this basis will result in one or more images that are of interest to at least the first user.

According to one aspect of the disclosure, a method of controlling a lifelog camera via a first intrapersonal area network (IAN) associated with a first user includes detecting a second IAN associated with a second user in range of the first IAN and capturing an image of the second user with the lifelog camera.

According to an embodiment of the method, the method further includes identifying an identity of the second user and storing the identity with the captured image.

According to an embodiment of the method, the method further includes tagging the captured image as having been captured in response to determining that the second IAN was in range.

According to an embodiment of the method, the method further includes determining if the second user is a desirable target by communication between the first IAN and the second IAN, wherein the capturing only occurs if the second user is a desirable target.

According to an embodiment of the method, communication between the first IAN and the second IAN includes a request from the first IAN to the second IAN for identification information for the second user and a response from the second IAN to the first IAN comprising identification information for the second user.

According to an embodiment of the method, the second user is a desirable target if the identification information meets certain desirability requirements.

According to an embodiment of the method, the desirability requirements are set by the first user.

According to an embodiment of the method, detecting a second IAN associated with a second user in range of the first IAN includes detecting a signal strength of the second IAN and determining whether the detected signal strength meets a minimum threshold level.

According to an embodiment of the method, detecting a second IAN associated with a second user in range of the first IAN includes determining a duration of the detection and determining whether the duration of the detection meets a minimum threshold level.

According to an embodiment of the method, the minimum threshold level is set by the first user.

According to one aspect of the disclosure, an electronic device in a first intrapersonal area network (IAN) associated with a first user includes a camera module and a control circuit configured to detect a second IAN associated with a second user in range of the first IAN and capture an image of the second user with the camera module.

According to an embodiment of the electronic device, the control circuit is further configured to identify an identity of the second user and store the identity with the captured image.

According to an embodiment of the electronic device, the control circuit is further configured to tag the captured image as having been captured in response to determining that the second IAN was in range.

According to an embodiment of the electronic device, the control circuit is further configured to determine if the second user is a desirable target by communication between the first IAN and the second IAN, wherein the capturing only occurs if the second user is a desirable target.

According to an embodiment of the electronic device, communication between the first IAN and the second IAN comprises a request from the first IAN to the second IAN for identification information for the second user and a response from the second IAN to the first IAN including identification information for the second user.

According to an embodiment of the electronic device, the second user is a desirable target if the identification information meets certain desirability requirements.

According to an embodiment of the electronic device, the desirability requirements are set by the first user.

According to an embodiment of the electronic device, detecting a second IAN associated with a second user in range of the first IAN comprises detecting a signal strength of the second IAN and determining whether the detected signal strength meets a minimum threshold level.

According to an embodiment of the electronic device, detecting a second IAN associated with a second user in range of the first IAN comprises determining a duration of the detection and determining whether the duration of the detection meets a minimum threshold level.

According to an embodiment of the electronic device, the minimum threshold level is set by the first user.

DETAILED DESCRIPTION OF EMBODIMENTS

Figure 1:
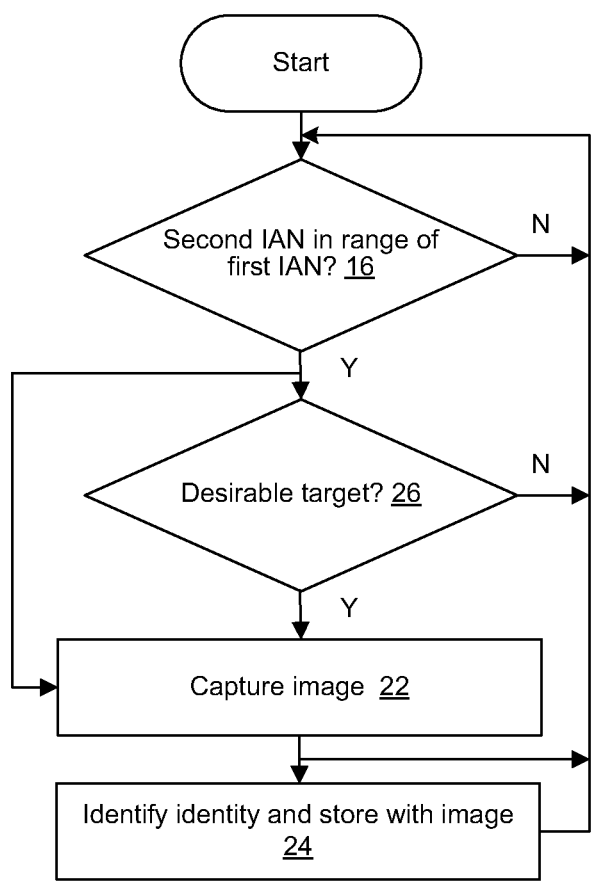
FIG. 1 is a flow diagram of functions carried out by the lifelog camera.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling the electronic device using an intrapersonal area network (IAN).

The electronic device is typically—but not necessarily—a dedicated lifelog camera. In other embodiments, the electronic device may be some other portable electronic device such as, but not limited to, a mobile telephone, a tablet computing device, a gaming device, a digital point-and-shoot camera, or a media player.

An IAN is a low-power, short-range wireless communication network including multiple devices on or near a body. In an IAN, the individual wearing the IAN constitutes one network. The network generally consists of one coordinator node and a plurality of device nodes. The coordinator node communicates with and controls the device nodes. The device nodes include various sensors and other devices that communicate with the coordinator node. Communication in an IAN occurs entirely within, on, and in the immediate proximity of the body of the individual wearing the IAN.

Figure 2:
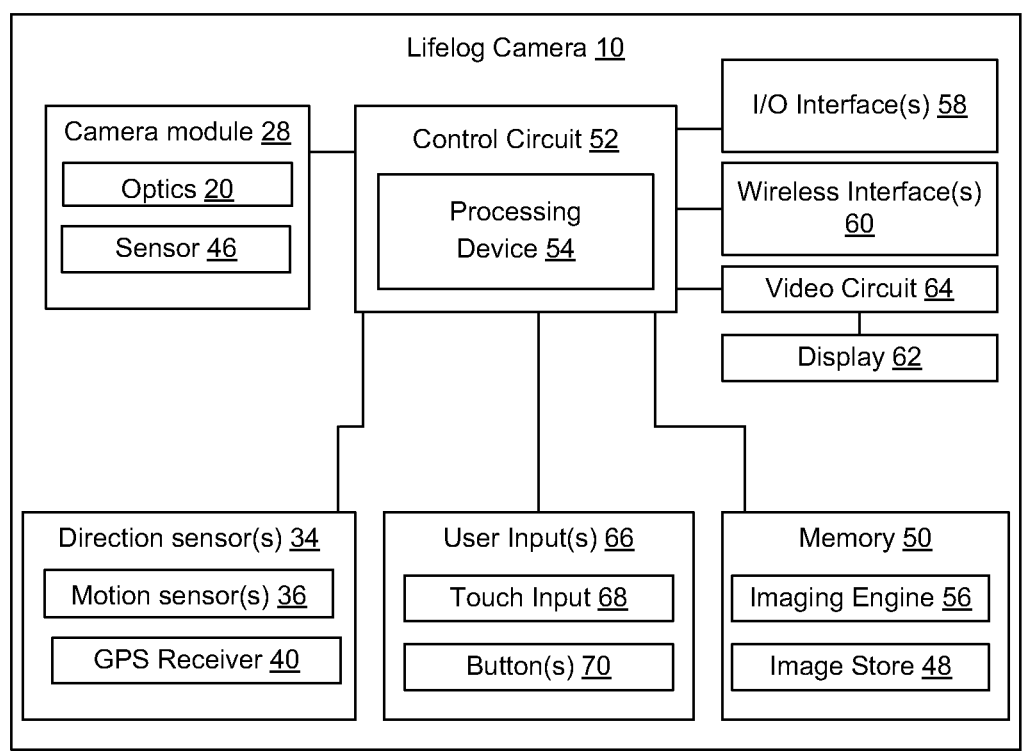
FIG. 2 is a schematic block diagram of the lifelog camera.
Figure 3:
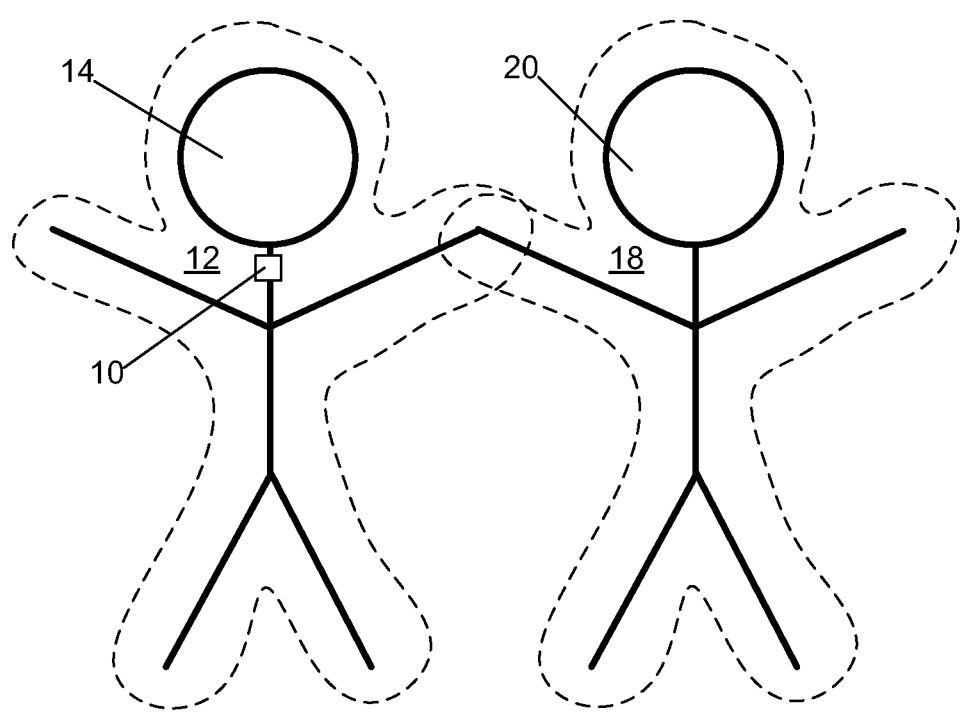
FIG. 3 is a schematic diagram of the lifelog camera in use.

With initial reference to FIGS. 1, 2 and 3, illustrated is an exemplary flow diagram representing steps that may be carried out by a lifelog camera 10 using a first IAN 12 associated with a first user 14 as a trigger for taking photos. The first IAN 12 might include, for example, a coordinator node and one or more device nodes. The lifelog camera 10 may be worn on the user's body, for example as part of a pair of glasses (or a headset, visor, watch, wristlet, necklace, ring, earring or other piercing, etc.) and associated with the first IAN 12 associated with the first user 14. In one embodiment, the lifelog camera 10 may be part of the first IAN 12 (e.g., may be the coordinator node, or a part of the coordinator node, or a device node, or a part of a device node). The IAN may also be in communication with the first IAN 12, for example, by communicating with the first IAN 12 via the coordinator node. This communication may be carried out by wireless network technology such as, Wi-Fi, Bluetooth, etc., and would allow the camera to be worn, for example, on the user's clothes. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 16 in which an attempt is made to detect a second IAN 18 associated with a second user 20 in range of the first IAN 12 associated with the first user 14. Because IAN is a short-range network technology, using the first IAN 12 to detect the second IAN 18 and requiring the second IAN 18 to be within range of the first IAN 12 will likely result in the second user 20 being in close proximity to the first user 14 when the second IAN 18 is detected. For example, when the first user 14 touches the second user 20 (e.g., shakes hands, hugs, kisses, lifts, high-fives, etc.), the first IAN 12, may detect the second IAN 18.

In one embodiment, the likelihood of close proximity between the first user 14 and the second user 20 may be further increased by requiring that the second IAN 18 has a minimum signal strength. In one embodiment, this may be accomplished where detecting a second IAN associated with a second user in range of the first IAN includes detecting a signal strength of the second IAN and determining whether the detected signal strength meets a minimum threshold level. In one embodiment, this minimum threshold level may be specified in a predetermined manner, such as by default setting or as specified by the first user 14.

In one embodiment, accidental detections, such as those that might be made during an inadvertent touch, such as in a crowded room or in line at a store, might be reduced by, for example, requiring that the touch be of a minimum duration. In one embodiment, this may be accomplished where detecting a second IAN associated with a second user in range of the first IAN includes determining a duration of the detection and determining whether the duration of the detection meets a minimum threshold level. In one embodiment, this minimum threshold level may be specified in a predetermined manner, such as by default setting or as specified by the first user 14.

If no second IAN 18 associated with a second user 20 is detected in range of the first IAN 12 associated with the first user 14 in block 16, the logical flow may return to block 16. However, if a second IAN 18 associated with a second user 20 is detected in range of the first IAN 12 associated with the first user 14, the logical flow may proceed to block 22 where an image of the second user is captured with the lifelog camera 10. It is contemplated that, by capturing images where the first user 14 and the second user 20 are in close proximity, including close personal contact (e.g., handshake, hug, kiss, high-five, etc.), the images will include persons or moments in the user's life that the user would desire to have cataloged.

Because the use of IAN technology will likely result in the second user 20 being in close proximity to the first user 14 when the second IAN 18 is detected, as described above with reference to block 16, it is also likely that an image captured by the lifelog camera 10 upon detection of the second IAN 18 associated with the second user 20 will include the second user 20. Further, because requiring that the second IAN 18 have a minimum signal strength may further increase the likelihood of close proximity of the first user 14 and the second user 20, as described above with reference to block 16, it also may increase the likelihood that an image captured by the lifelog camera 10 upon detection of the second IAN 18 would include the second user 20.

The value of encouraging close proximity between the first user 14 and the second user 20 is illustrated, for example, in the situation where the first user 14 is in a crowded room that includes multiple individuals with IANs. In such a setting, it would be undesirable if the lifelog camera 10 of the first user 14 captured an image every time a second IAN associated with a second user was detected anywhere in the room. These images would be of little use to the first user 14 because, for example, it would be difficult, if not impossible, to associate these images with the individuals in the room that triggered the capture with their IANs. However, by using IAN technology and, in some embodiments, requiring the second IAN 18 to have a minimum signal strength, it is much more likely that the second user 20 will be in close proximity to the first user 14 during image capture and will therefore be the subject of the captured image.

With further reference to the situation of the first user 14 in a crowded room, the value of requiring a minimum duration of the detection of the second IAN 18 to avoid accidental detections is also illustrated. In such a setting, it would be undesirable if the lifelog camera 10 of the first user 14 captured an image every time the first IAN 12 detected a second IAN associated with a second user, regardless of the duration of the detection. These images would be of little use to the first user 14 because, for example, they would depict individuals that the first user 14 had merely bumped into or otherwise inadvertently touched rather than individuals whose images the first user 14 actually wanted to capture. However, by requiring a minimum duration of detection, it is much more likely that the images captured by the lifelog camera 10 will depict those individuals with which the first user 14 had meaningful interaction.

In one embodiment, block 22 may include tagging the captured image as having been captured in response to the determination that the second IAN 18 was in range of the first IAN 12. In this way, images that were captured by the lifelog camera 10 based on the determination that the second IAN 18 was in range of the first IAN 12 may be distinguished from images that were captured by the lifelog camera 10 on a timed basis.

Following block 22, the logical flow may return to block 16. Alternatively, or additionally, the logical flow may also proceed to block 24.

In block 24, an identity of the second user 20 is identified by communication between the first IAN 12 and the second IAN 18 and the identity is stored with the captured image. In one embodiment, this communication includes a request from the first IAN 12 to the second IAN 18 for identification information for the second user 20 and a response from the second IAN 18 to the first IAN 12 including identification information for the second user 20.

Identification information might include, for example, contact information, social media information and/or networking information. Exemplary contact information includes, but is not limited to, name, home address, work address, home telephone number, work telephone number, cellular telephone number, work email addresses and personal email addresses. Exemplary social media information includes, but is not limited to: information related to blogs and microblogs (e.g., Twitter, Tumblr, Pinterest, etc.), including usernames, handles or website addresses, for example; information related to social networking sites (e.g., Facebook, MySpace, LinkedIn, Foursquare, etc.), including personal web page addresses, for example; information related to online dating sites (e.g., Match, eHarmony, JDate, Farmer's Only, etc.) including personal web page addresses, for example; information related to virtual gaming worlds (e.g. World of Warcraft, etc.) including usernames or handles, for example; and information related to virtual social worlds (e.g. Second Life, etc.) including usernames or handles, for example. Exemplary networking information includes, but is not limited to, information describing the networking goals and status of the user. For example, a user's networking goals or status might be "looking for a friend," "looking for a relationship", or "looking for a job."

In one embodiment, the identity of the second user may include some portion of the identification information. In one embodiment, this portion may be specified in a predetermined manner, such as by default setting or as specified by the first user 14.

Following block 24, the logical flow may return to block 16.

In one embodiment, if a second IAN 18 associated with a second user 20 is detected in range of the first IAN 12 associated with the first user 14 in block 16, the logical flow may alternatively proceed to block 26.

In block 26, a determination is made as to whether or not the second user 20 is a desirable target. This determination is made using communication between the first IAN 12 and the second IAN 18. In one embodiment, this communication includes a request from the first IAN 12 to the second IAN 18 for identification information for the second user 20 and a response from the second IAN 18 to the first IAN 12 including identification information for the second user 20.

Identification information might include, for example, contact information, social media information and/or networking information. Exemplary contact information includes, but is not limited to, name, home address, work address, home telephone number, work telephone number, cellular telephone number, work email addresses and personal email addresses. Exemplary social media information includes, but is not limited to: information related to blogs and microblogs (e.g., Twitter, Tumblr, Pinterest, etc.), including usernames, handles or website addresses, for example; information related to social networking sites (e.g., Facebook, MySpace, LinkedIn, Foursquare, etc.), including personal web page addresses, for example; information related to online dating sites (e.g., Match, eHarmony, JDate, Farmer's Only, etc.) including personal web page addresses, for example; information related to virtual gaming worlds (e.g. World of Warcraft, etc.) including usernames or handles, for example; and information related to virtual social worlds (e.g. Second Life, etc.) including usernames or handles, for example. Exemplary networking information includes, but is not limited to, information describing the networking goals and status of the user. For example, a user's networking goals or status might be "looking for a friend," "looking for a relationship", or "looking for a job."

In one embodiment, the second user 20 is a desirable target if the identification information, as discussed above, meets certain desirability requirements. In one embodiment, the desirability requirements to be met may be specified in a predetermined manner, such as by default setting or as specified by the first user. For example, the first user 14 may only consider those individuals that are members certain social networks to be desirable targets. In that situation, the first user 14 could set the desirability requirements to include a requirement that a desirable target be a member of those social networks. Then, if the second user 20 were not a member of those social networks, the second user 20 would not be identified as a desirable target.

If the second user 20 is identified as a desirable target in block 24, the logical flow moves to block 22. If the second user 20 is not identified as a desirable target, the logical flow may return to block 16.

With additional reference to FIG. 2, illustrated is a schematic block diagram of an exemplary electronic device configured as a lifelog camera 10. The lifelog camera 10 includes a camera module 28. The camera module 28 includes appropriate optics 30 and a sensor 32 for imaging a scene to generate still images and, in some cases, video. Although not illustrated, a microphone may be present to a capture sound component for the video. Images and video captured by the camera module 28 may be stored in an image store 34 of a memory 36.

The lifelog camera 10 includes a control circuit 38 that is responsible for overall operation of the lifelog camera 10, including obtaining images with the camera module 16. In one embodiment, the control circuit 38 includes a processing device 40 that executes operating instructions. In one embodiment, control over detecting a second IAN associated with a second user, the capturing of an image of the second user and the storing of the image is embodied as part of an imaging engine 42. The imaging engine 42 also may be stored in memory 36.

The imaging engine 42 may be embodied in the form of an executable logic routine (e.g., lines of code, a software program, firmware, etc.) that is stored on a non-transitory computer readable medium (e.g., the memory 36) of the lifelog camera 10 and that is executed by the control circuit 38. The described operations may be thought of as a method that is carried out by the lifelog camera 10.

The processing device 40 of the control circuit 38 may be a central processing unit (CPU), a microcontroller, or a microprocessor that executes code in order to carry out operation of the lifelog camera 10. The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 38. The memory 36 may exchange data with the control circuit 38 over a data bus. Accompanying control lines and an address bus between the memory 36 and the control circuit 38 also may be present. The memory 36 is considered a non-transitory computer readable medium.

The lifelog camera 10 may include interfaces for establishing communication with another device, such as a computer, a mobile phone, a wireless router for establishing Internet access, a coordinator node of an IAN, a device node of an IAN, etc. An exemplary interface is an input/output (I/O) interface 44 in the form of an electrical connectors and interface circuitry for establishing connectivity to another device using a cable. A typical I/O interface 44 may be a USB port. Operating power and/or power to charge a battery (not shown) of the lifelog camera 10 may be received over the I/O interface 44. The battery may supply power to operate the lifelog camera 10 in the absence of an external power source. Another exemplary interface is a wireless interface 46. The wireless interface 46 may be, for example, an interface 46 that operates in accordance with BAN standards, Bluetooth standards, WiFi standards, or another wireless standard. Multiple wireless interfaces 46 may be present to operate over multiple standards (e.g., BAN, Bluetooth and WiFi).

The lifelog camera 10 may include a display 48 for displaying captured images and for assisting the user in adjusting settings. The display 48 may be coupled to the control circuit 38 by a video circuit 50 that converts video data to a video signal used to drive the display 48. The video circuit 50 may include any appropriate buffers, decoders, video data processers and so forth. The lifelog camera also may not include a display, in which case images are viewed using a different device after transferring the images from the lifelog camera to the other device.

The lifelog camera 10 may include one or more direction sensors/inputs 52. An exemplary direction sensor 52 includes a motion sensor 54, such as one or more accelerometers or one or more gyros, etc. Another exemplary input 52 includes a position data receiver, such as a global positioning system (GPS) receiver 56.

The lifelog camera 10 may include one or more user inputs 58 for receiving user input for controlling operation of the lifelog camera 10. Exemplary user inputs 58 include, but are not limited to, a touch input 60 that overlays or is part of the display 48 (if present) for touch screen functionality, one or more buttons 62, and so forth.

Although certain embodiments have been shown and described, it is understood that equivalents and modifications falling within the scope of the appended claims will occur to others who are skilled in the art upon the reading and understanding of this specification.

What is claimed is:

1. A method of controlling a lifelog camera associated with a first user, the method comprising:

determining that a second intrapersonal area network (IAN) associated with a second user is in range of a first IAN associated with the first user based on the first user and the second user being in touching contact with each other;

determining if the second user is a target to be captured by the lifelog camera by communication between the first IAN and the second IAN; and capturing an image of the second user with the lifelog camera based on determining that the second IAN is in range of the first IAN and that the second user is a target to be captured by the lifelog camera, wherein at least one of the first IAN and the second IAN comprises a plurality of nodes adapted to be worn on or near the body of the user associated with the IAN and to be in communication with one another, and wherein determining that the second IAN is in range of the first IAN includes detecting a signal strength of the second IAN and determining whether the detected signal strength meets a minimum threshold level.

2. The method of claim 1, further comprising identifying an identity of the second user and storing the identity with the captured image.

3. The method of claim 1, further comprising tagging the captured image as having been captured in response to determining that the second IAN was in range.

4. The method of claim 1, wherein communication between the first IAN and the second IAN comprises a request from the first IAN to the second IAN for identification information for the second user and a response from the second IAN to the first IAN comprising identification information for the second user.

5. The method of claim 4, wherein the second user is the desirable target if the identification information meets certain desirability requirements.

6. The method of claim 5, wherein the desirability requirements are set by the first user.

7. The method of claim 1, wherein detecting the second IAN associated with the second user in range of the first IAN comprises determining a duration of the detection and determining whether the duration of the detection meets a minimum threshold level.

8. The method of claim 1, wherein the minimum threshold level is set by the first user.

9. An electronic device associated with a first user, the electronic device comprising:

a camera module; and a control circuit configured to:

determine that a second intrapersonal area network (IAN) associated with a second user is in range of a first IAN associated with the first user based on the first user and the second user being in touching contact with each other;

determine if the second user is a target to be captured by the lifelog camera by communication between the first IAN and the second IAN; and capture an image of the second user with the camera module, wherein the capturing is triggered by determining that the second IAN is in range of the first IAN and that the second user is a target to be captured by the lifelog camera, wherein at least one of the first IAN and the second IAN comprises a plurality of nodes adapted to be worn on or near the body of the user associated with the IAN and to be in communication with one another and wherein determining that the second IAN is in range of the first IAN includes detecting a signal strength of the second IAN and determining whether the detected signal strength meets a minimum threshold level.

10. The electronic device of claim 9, wherein the control circuit is further configured to identify an identity of the second user and store the identity with the captured image.

11. The electronic device of claim 9, wherein the control circuit is further configured to tag the captured image as having been captured in response to determining that the second IAN was in range.

12. The electronic device of claim 9, wherein communication between the first IAN and the second IAN comprises a request from the first IAN to the second IAN for identification information for the second user and a response from the second IAN to the first IAN comprising identification information for the second user.

13. The electronic device of claim 12, wherein the second user is the desirable target if the identification information meets certain desirability requirements.

14. The electronic device of claim 13, wherein the desirability requirements are set by the first user.

15. The electronic device of claim 9, wherein detecting the second IAN associated with the second user in range of the first IAN comprises determining a duration of the detection and determining whether the duration of the detection meets a minimum threshold level.

16. The electronic device of claim 9, wherein the minimum threshold level is set by the first user.

\* \* \* \* \*